INVENTOR.
JAMES E. FORBES
BY
Ralph L Chappell

Sept. 2, 1952     J. E. FORBES     2,608,948
INDICATING INSTRUMENT
Filed June 30, 1945          3 Sheets-Sheet 2

INVENTOR.
JAMES E. FORBES
BY
Ralph Chappell

Sept. 2, 1952  J. E. FORBES  2,608,948
INDICATING INSTRUMENT
Filed June 30, 1945  3 Sheets-Sheet 3
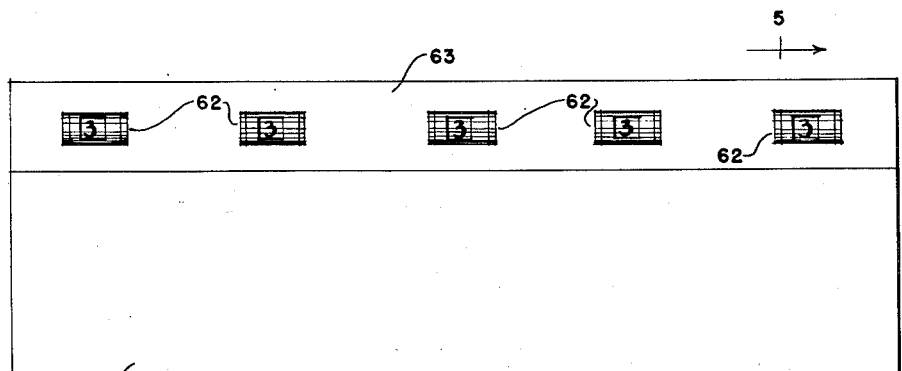
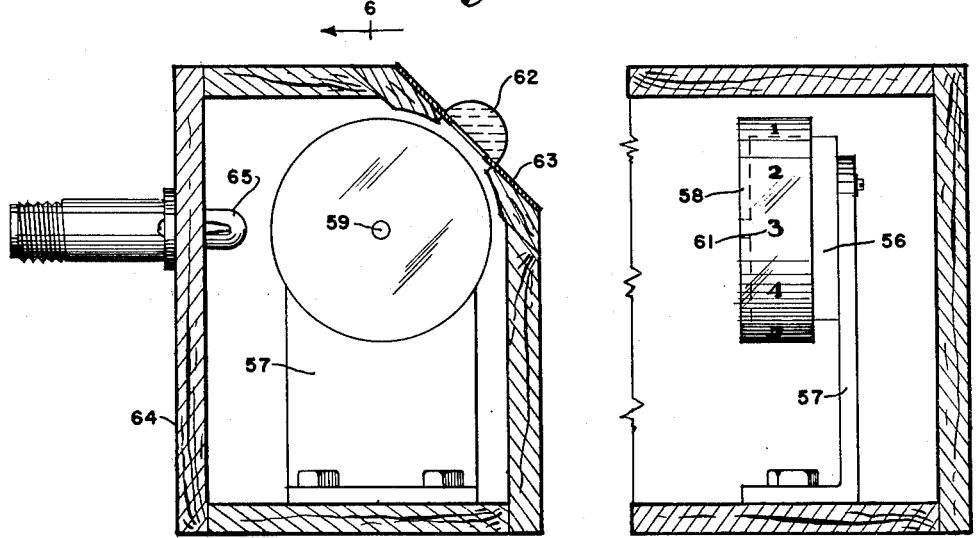
*Fig. 5.*  *Fig. 6.*
INVENTOR.
JAMES E. FORBES
BY
Ralph L. Chappell Patented Sept. 2, 1952

2,608,948

UNITED STATES PATENT OFFICE 2,608,948

INDICATING INSTRUMENT

James E. Forbes, United States Navy

Application June 30, 1945, Serial No. 602,629

8 Claims. (Cl. 116—135)

(Granted under the act of March 3, 1883, as amended April 30, 1928; 370 O. G. 757)

The present invention relates to indicating instruments. More specifically, the invention concerns improvements in the linear-pattern type of instrument indication.

In the prior art, mechanisms such as internal-combustion engines have customarily been provided with a plurality of separate and independent instruments to indicate conditions of temperature, pressure, etc., in the engine, but the various indications have been entirely unrelated, with the result that an evaluation of the performance of the mechanism can be reached only after an analysis of the conditions of operation, and after a study of the reading of each instrument in the light of the operating conditions existing at the moment.

More recently, means have been devised whereby all of the essential conditions incident to the operation of a machine are correlated and presented to an observer in a unitary and characteristic pattern, so that an observer familiar with the pattern presented by the instrument during proper machine operation may rest assured the mechanism is operating properly as long as the pattern remains unchanged and will instantly recognize any deviations from this as an indication of some malfunctioning of the machine. This involves certain mechanical difficulties, however, that the present invention overcomes.

It is, therefore, one of the principal objects of the invention to provide an instrument wherein various related indications are presented in a straight-line pattern irrespective of the individual quantities involved.

A further object is to provide an instrument wherein the several individual indications of the instrument will assume a predictable relationship with each other in any one of the multitudinous possible combinations of conditions that are encountered during proper functioning of the machine, so that any malfunctioning of the machine will be instantly apparent by reason of a deviation from the pre-computed ideal relationship.

A further object is to provide an instrument of the type indicated above having the characteristics of simple, rugged construction, dependable operation, and good visibility.

Other objects and many of the attendant advantages of this invention will be readily appreciated as the same becomes better understood by reference to the following detailed description when considered in connection with the accompanying drawings wherein:

Fig. 4 is a front elevational view of a modified form of the invention;

Fig. 5 is a section taken on the line 5—5 of Fig. 4; and

Fig. 6 is a fragmental sectional view taken on the line 6—6 of Fig. 5.

Similar numerals refer to similar parts throughout the several views.

Figure 1:
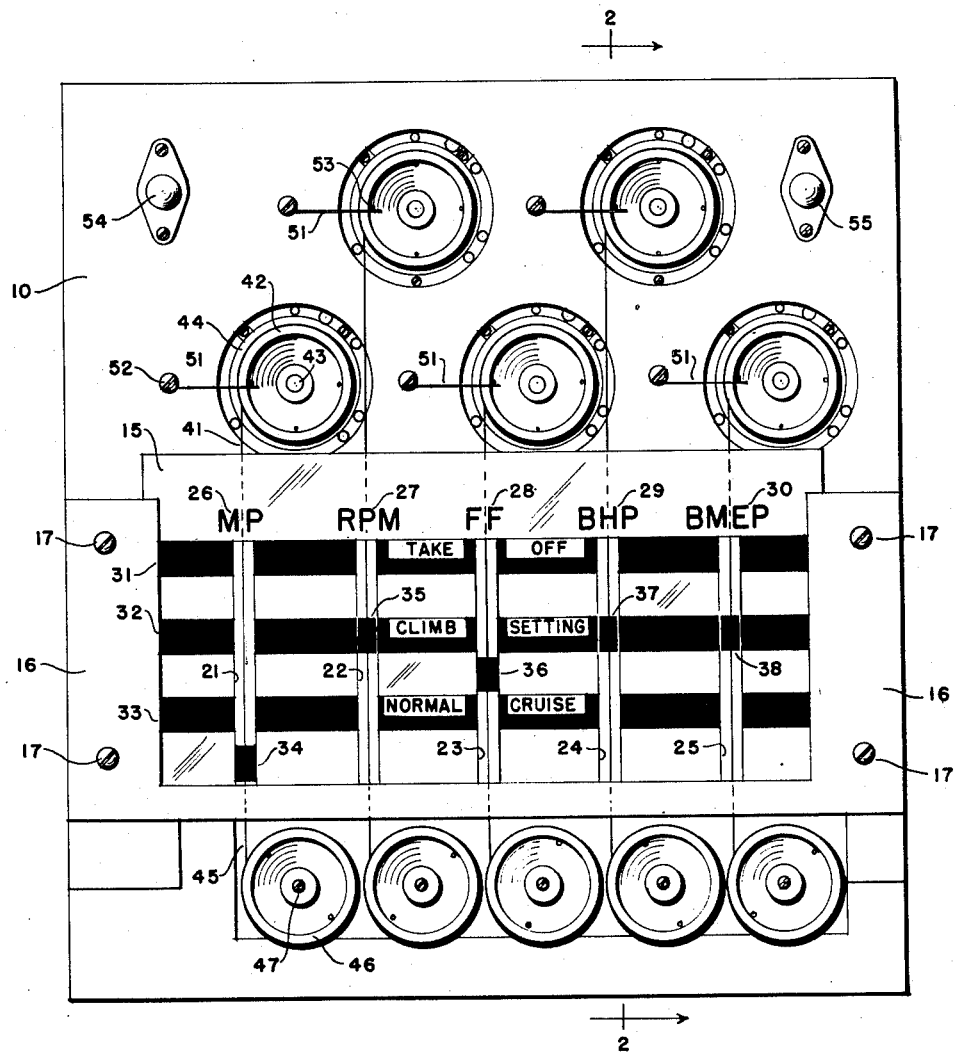
Fig. 1 is a front elevational view of an engine indicator, showing a preferred embodiment of the invention.
Figure 3:
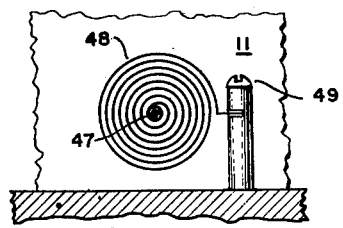
Fig. 3 is an enlarged detail sectional view taken at the point indicated by the line 3—3 in Fig. 2.
Figure 2:
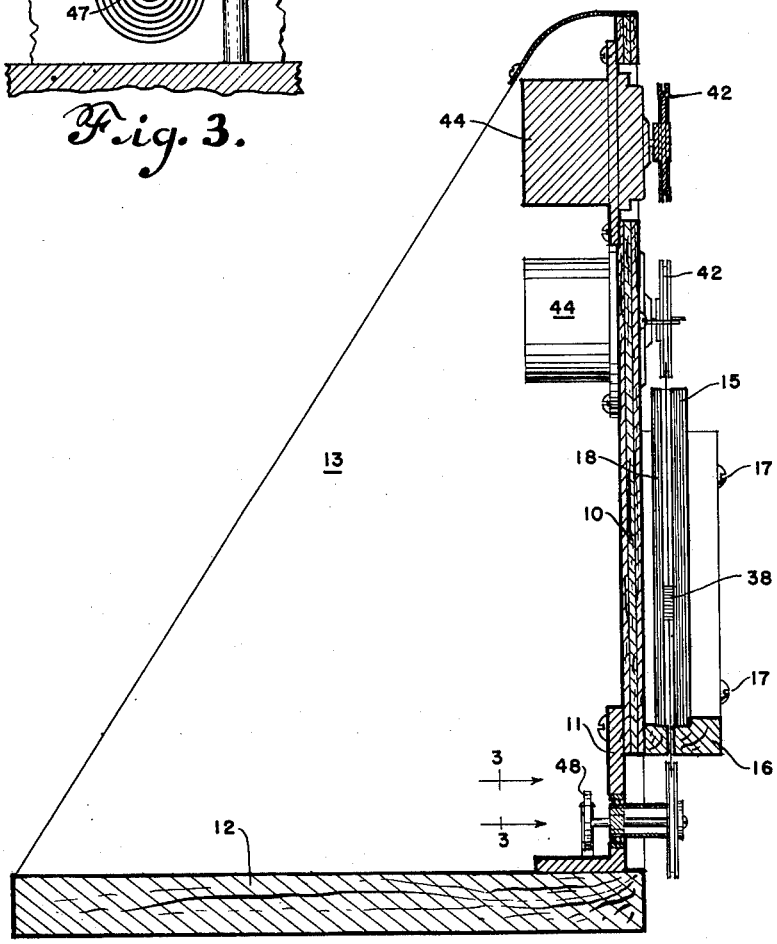
Fig. 2 is a section taken on the line 2—2 of Fig. 1.

In Figs. 1 to 3 inclusive, the structures comprising the indicating instrument are illustrated as being mounted on a panel 10 carried by a bracket 11 mounted on a base 12 and reinforced with side plates 13. It should be understood, however, that this mounting is merely representative of one means of supporting the mounting panel 10 and that the panel 10 can be the instrument board of an aircraft or any other panel on which the indicating instrumentalities are to be supported.

The indicating instrument includes a transparent dial plate 15 supported in a 3-sided frame 16 which is secured to the panel 10 in any convenient manner, as by the screws 17. A second dial plate 18, which can also be of transparent material, is secured immediately behind the plate 15. However, the second plate 18 is milled to include a number of vertical grooves or slideways indicated at 21 to 25 inclusive.

The dial plate 15 is provided with indicia 26, 27, 28, 29, and 30 to indicate manifold pressure, revolutions per minute, fuel flow, brake horsepower, and brake mean effective pressure respectively. In addition, the dial plate 15 carries reference markings in the form of horizontal bands 31, 32 and 33 indicating positions of take off, climb, and normal cruising. The various dial plate markings can be applied in any conventional manner, as by etching or painting, or they can be applied by inserting a marked film between the two dial plates 15 and 18.

A marker consisting of a colored plastic slug 34 is mounted for vertical sliding movement on the slideway 21 and similar markers 35, 36, 37, and 38 are positioned in the slideways 22 to 25 inclusive. Each of these markers is connected operatively to a servo repeater motor by a flexible tension element comprising a fine thread 41 extending upwardly through the slideway and anchored on a pulley wheel 42 carried on the armature shaft 43 of the servo 44. When energized, the servo motors 44 lift their associated markers upwardly in the slideways. When the motors are not energized, the markers are returned to the bottom of the slideways by the downwardly extending threads 45 that are anchored on the pulley wheels 46 carried by stub shafts 47. These shafts are spring-urged in a counter-clockwise direction (as viewed in Fig. 1) by the hairsprings 48, extending between the stub shafts 47 and the studs 49 on the bracket 11. The downward travel of the markers is limited by limit stops 51. These stops consist of relatively fine wires anchored on cap screws 52 and positioned to extend over the rim of the wheels 42 and engage the stop pins 53 as the markers approach the lower end of the vertical slideways.

The instrument panel can be illuminated, and while this can be done in any conventional manner, the form of illumination illustrated includes a pair of incandescent lamp bulbs 54 and 55 located above the dial plates 15 and 18 so that the plates are illuminated from their edge and the light will be diffused through the plates to all points of the dial.

The form of the invention illustrated in Figs. 4 to 6 inclusive includes a plurality of servo repeater motors 56 mounted on individual brackets 57. The armature shafts 59 of the servos rotate drum-shaped dials 58 so that the indicia 61 on the dials move under the magnifying lenses 62 in the windows of the inclined front panel 63 of the instrument. In the form of instrument illustrated, the several indicating dials are housed in a rectangular cabinet 64 and incandescent lamps 65 are positioned behind each of the dials so that the interior of the cabinet is well lighted and the indicia of each indicator drum is seen through the magnifying lenses 62.

In the operation of an internal-combustion engine such as an airplane motor, there are many possible combinations of the various individual engine-temperature and -pressure indications that will combine to give a satisfactory performance of the motor. However, these exact quantities are covered largely by the basic considerations of altitude and speed, and for any specified conditions of flight there are corresponding ideal conditions of the individual motor indications. Thus in Fig. 1 the horizontal band indicating normal cruising position extends completely across the dial and furnishes a base reference for each of the individual markers in the slideways. The instrument is calibrated electrically (by electric circuits forming no part of the present invention) so that whenever the individual indications are quantitatively ideal for normal cruising flight the several repeater servos 44 will raise each of the individual markers to a point exactly in line with the "normal cruise" band. Thus, as long as the pilot of the aircraft sees the several markers in alignment, he can be sure that the motor is functioning properly. Similarly, any misalignment of one of the markers is an indication that the motor operation is deviating from the ideal in that particular respect. Under other power conditions, each individual motor indication is not necessarily the same, but the overall relationship of the various indications is maintained. For example, under conditions of take-off, the electrical mechanisms operating the servo repeaters 44 will be adjusted so that any ideal combination of the individual indications results in energizing the servo repeaters sufficiently to bring all of the sliding markers in alignment with the "take-off" reference band. Here again, the pilot need only glance at the instrument to determine that the engine is functioning under ideal conditions. If any malfunctioning is present, it is readily apparent by some misalignment of the markers relative to the reference band.

In the form of the invention illustrated in Figs. 4 to 6 inclusive, a similar result is accomplished by providing each of the drums 58 with indicia 61 arranged in numerical sequence. Here each numeral will represent a given operating condition, so that whenever the pilot observes the same numeral through each of the magnifying lenses 62 he will know that the engine is in ideal condition for operation under that power condition. Conversely, the appearance of different numerals beneath the several lenses of the dial will indicate improper operation.

While I have shown and described only two combinations of elements for putting the invention in practice, I am aware that it is subject to numerous other modifications and variations. I therefore wish to point out that the specific structures shown in the drawings are for purpose of illustration only, and that the invention is subject to other variations within the scope of the claims.

The invention described herein may be manufactured and used by or for the Government of the United States for governmental purposes without the payment of any royalties thereon or therefor.

I claim:

1. An indicating instrument comprising a dial having a plurality of slideways extending across the dial in parallel relationship to each other, a marker mounted slidably in each of the slideways, individual means for shifting each of said markers along its slideway a distance bearing a predetermined relation to the distance each of the other markers is shifted, said means including a tension element anchored to the marker and extending longitudinally along the slideway, a pulley wheel, means for rotating said pulley wheel, a second pulley for the tension element at the opposite end of the slideway, and a takeup spring associated with the second pulley wheel.

2. An indicating instrument comprising a plurality of markers, a panel having a plurality of paths and a plurality of bands intersecting said paths, and means responsive to a plurality of respective conditions and each adapted for respectively moving one of said markers along one of said paths, said means being so proportioned that said markers and one of said bands form a symmetrical configuration when a first set of said conditions occur predeterminedly, and said markers and others of said bands form symmetrical configurations when other sets of said conditions occur predeterminedly.

3. An indicating instrument comprising a plurality of markers, a panel having a plurality of paths and a plurality of bands intersecting said paths, and means responsive to a plurality of respective conditions and each adapted for respectively moving one of said markers along one of said paths, said means being so proportioned that said markers and one of said bands form a linear configuration when a first set of said conditions occur predeterminedly, and said markers and others of said bands form symmetrical configurations when other sets of said conditions occur predeterminedly.

4. An indicating instrument comprising a plurality of markers, a panel having a plurality of paths and a plurality of bands intersecting said paths, and means responsive to a plurality of respective conditions and each adapted for respectively moving one of said markers along one of said paths, said means being so proportioned that said markers and one of said bands form a linear configuration when a first set of said conditions conform predeterminedly, and said markers and others of said bands form linear configurations when other sets of said conditions conform predeterminedly.

5. An indicating instrument comprising a panel, a plurality of slideways carried on said panel, a plurality of reference bands extending across said panel and intersecting said slideways, a marker mounted slidably in each of said slideways, and individual means responsive to a condition to be indicated for shifting each of said markers along a slideway a distance bearing a predetermined relation to the distance each of the other markers is shifted and to the position of one of said reference bands.

6. An indicating instrument comprising an instrument panel, a plurality of windows in said panel, a plurality of dials, each dial having markers adapted to register with one of said windows, and individual means responsive to a condition to be indicated for shifting each of said dials a distance bearing a predetermined relation to the distance each of the other dials is shifted.

7. An indicating instrument comprising a dial having a plurality of slideways extending across the dial in parallel relationship to each other, and having a plurality of reference bands each consisting of a linear marking band extending completely across the dial in a direction normal to and intersecting said slideways, a marker mounted slideably in each of said slideways, and individual means for shifting each of said markers along its slideway a distance bearing a predetermined relation to the distance each of the other markers is shifted and to the position of one of said bands.

8. An indicating instrument comprising a dial having a plurality of slideways extending across the dial in parallel relationship to each other and having a plurality of reference bands each consisting of a linear marking band extending completely across the dial in a direction normal to and intersecting said slideways, a marker mounted slidably in each of said slideways, individual means for shifting each of said markers along its slideway a distance bearing a predetermined relation to the distance each of the other markers is shifted and to the position of one of said bands, said means including a tension element anchored to the marker and extending longitudinally along the slideway, a first pulley, means for rotating said pulley, a second pulley for said tension element at the opposite end of said slideway, and a takeup spring associated with said second pulley.

JAMES E. FORBES.

REFERENCES CITED

The following references are of record in the file of this patent:

UNITED STATES PATENTS

| Number | Name | Date |
|---|---|---|
| 529,433 | Van Vleck | Nov. 20, 1894 |
| 1,166,034 | Akemann | Dec. 28, 1915 |
| 1,467,853 | Heinold | Sept. 11, 1923 |
| 1,812,752 | Merrill | June 30, 1931 |
| 2,291,610 | Crane | Aug. 4, 1942 |
| 2,412,350 | Morgan | Dec. 10, 1946 |
| 2,476,315 | Morrison | July 19, 1949 |

FOREIGN PATENTS

| Number | Country | Date |
|---|---|---|
| 441,108 | Great Britain | July 16, 1935 |